United States Patent
Li et al.

(10) Patent No.: US 8,493,446 B2
(45) Date of Patent: Jul. 23, 2013

(54) INTELLIGENT HEADLIGHT CONTROL USING CAMERA SENSORS

(75) Inventors: Ying Li, Mohegan Lake, NY (US); Sharathchandra Pankanti, Darien, CT (US)

(73) Assignee: International Business Machines Corporation, Armonk, NY (US)

( * ) Notice: Subject to any disclaimer, the term of this patent is extended or adjusted under 35 U.S.C. 154(b) by 619 days.

(21) Appl. No.: 12/488,924

(22) Filed: Jun. 22, 2009

(65) Prior Publication Data

US 2010/0265330 A1    Oct. 21, 2010

Related U.S. Application Data

(60) Provisional application No. 61/170,383, filed on Apr. 17, 2009.

(51) Int. Cl.
*H04N 7/18* (2006.01)
*G01J 1/32* (2006.01)

(52) U.S. Cl.
USPC .......................................... 348/148; 250/205

(58) Field of Classification Search
USPC ....................................................... 348/148
See application file for complete search history.

(56) References Cited

U.S. PATENT DOCUMENTS

| | | | | |
|---|---|---|---|---|
| 6,831,261 B2 * | 12/2004 | Schofield et al. | ............. | 250/205 |
| 2007/0221822 A1 * | 9/2007 | Stein et al. | .................... | 250/205 |
| 2009/0021581 A1 * | 1/2009 | Sun et al. | ...................... | 348/148 |

OTHER PUBLICATIONS

IPCOM000177533D, "System and Method of Intelligent Headlight Control Using a Two-Level Decision Framework," Dec. 17, 2008, http://ip.com/IPCOM/000177533.

* cited by examiner

*Primary Examiner* — Christopher S Kelley
*Assistant Examiner* — Hee-Yong Kim
(74) *Attorney, Agent, or Firm* — Thomas Grzesik; Fleit Gibbons Gutman Bongini & Bianco PL (57) ABSTRACT

A system and method for intelligently controlling headlights receive a multiplicity of images that represent frames of a video sequence of an external environment of a vehicle. At least one bright spot, or blob, is found that stands out from a dark background of the external environment within each frame of the multiplicity of images. A multiplicity of features is extracted from a found blob. A type is recognized of a found blob that is selected from a multiplicity of types of blobs. A determination is then made whether to turn on a high beam light or a low beam light based at least on the recognized type of the found blob and a set of rules. Finally, an action based on such decision is performed.

20 Claims, 9 Drawing Sheets

INTELLIGENT HEADLIGHT CONTROL USING CAMERA SENSORS

FIELD OF THE INVENTION

The present invention generally relates to human assistive environments, and more particularly relates to automatically and intelligently controlling headlights of a vehicle using camera sensors.

BACKGROUND OF THE INVENTION

Driving at night is usually more dangerous than driving during the day. Pedestrians and cyclists on the roads are especially at high risk due to the limited visibility of motorists at night. In fact, a recent study by University of Michigan Transportation Research Institute (UMTRI) found that pedestrians are about four to six times more vulnerable at night than during the day (See, for example, J. Sullivan and M. Flannagan, "Assessing the potential benefit of adaptive headlighting using crash databases," Report No. UMTRI-99-21, The University of Michigan Transportation Research Institute, 1999, which is hereby incorporated by reference in its entirety). This raises the importance of maximizing a driver's forward vision for night-time driving safety purpose. One way to achieve this is to improve the utilization of the vehicle's high-beam headlight so that the drivers can look far ahead for traffic signs, road geometry, other vehicles, pedestrians, and potential hazards. However, a recent study by U.S. Department of Transportation shows that, on average, drivers use their high beams less than 25% of the time during which conditions justified their use (See, for example, U.S. National Highway Traffic Safety Administration, "Traffic safety facts," 2000, which is hereby incorporated by reference in its entirety). Therefore, relying on drivers themselves to effectively utilize their high beams is not an optimal solution to maximizing a driver's forward vision for night-time driving.

SUMMARY OF THE INVENTION

In one embodiment, a method for an intelligent headlight control system is disclosed. The method includes receiving a plurality of images that represent frames of a video sequence of an external environment of a vehicle. At least one bright spot, or blob, is found that stands out from a dark background of the external environment within each frame of the plurality of images. A plurality of features is extracted from a found blob. A type is recognized for a found blob that is selected from a plurality of types of blobs. A determination is then made whether to turn on a high beam light or a low beam light based at least on the recognized type of the found blob and a set of rules. Finally, an action based on such decision is performed.

In another embodiment, an intelligent headlight control system is disclosed. The intelligent headlight control system comprises a memory and an information processor and controller that are communicatively coupled with the memory. A video imaging system is communicatively coupled with the information processor and controller and the memory. The video imaging system is for receiving a plurality of images representing frames of a video sequence of an external environment of a vehicle. A blob detector is communicatively coupled with the video imaging system, the information processor and controller, and the memory. The blob detector is for finding at least one bright spot, or blob, that stands out from a dark background of the external environment within each frame of the plurality of images. A blob feature extractor is communicatively coupled with the blob detector and is for extracting a plurality of features from a blob found by the blob detector. A blob classifier is communicatively coupled with the blob feature extractor and the blob detector and is for recognition of a type of a blob, selected from a plurality of types of blobs that is found by the blob detector. An event controller is communicatively coupled with the blob classifier and the blob detector. The light beam controller is for determining a binary decision based at least on the recognized type of blob that is found by the blob classifier and a set of rules, and performs an action based on such decision accordingly.

In yet another embodiment, a computer program product for intelligently controlling a headlight system is disclosed. The computer program product includes instructions for receiving a plurality of images that represent frames of a video sequence of an external environment of a vehicle. At least one bright spot, or blob, is identified that stands out from a dark background of the external environment within each frame of the plurality of images. A plurality of features is extracted from a found blob. A type is recognized for a found blob that is selected from a plurality of types of blobs. A determination is then made whether to turn on a high beam light or a low beam light based at least on the recognized type of the found blob and a set of rules. Finally, an action based on such decision is performed.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

As required, detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure and function. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

The various embodiments of the presently claimed invention are advantageous because a vehicle's beam state (high beam or low beam) during a night-time drive is automatically controlled via an intelligent headlight control system. In one embodiment, camera sensors are used to accomplish such a task. In this embodiment video signals captured from cameras are analyzed and certain information is collected from the vehicle's CAN Bus (Controller-area network). Based on this analysis and collected information, the system is able to accurately detect various scenarios that require beam-switching at real time.

In one embodiment, a multi-level decision framework is applied that automatically controls the switching between high beam and low beam of an automobile during a night drive. In this embodiment, a Support Vector Machine (SVM)-based learning approach is applied to recognize different types of image blobs, based on which a frame-level decision making process is carried out to determine the final beam state at real time. In another embodiment, a blob detector is able to detect both bright (headlight- and streetlight-like) and dim (taillight-like) blobs. The SVM model can be trained with weighting factors so as to accommodate un-balanced training data. The training data can be sub-sampled for the other object class. Multiple binary classifiers can be used instead of a single multi-class classifier.

General Overview

Figure 1:
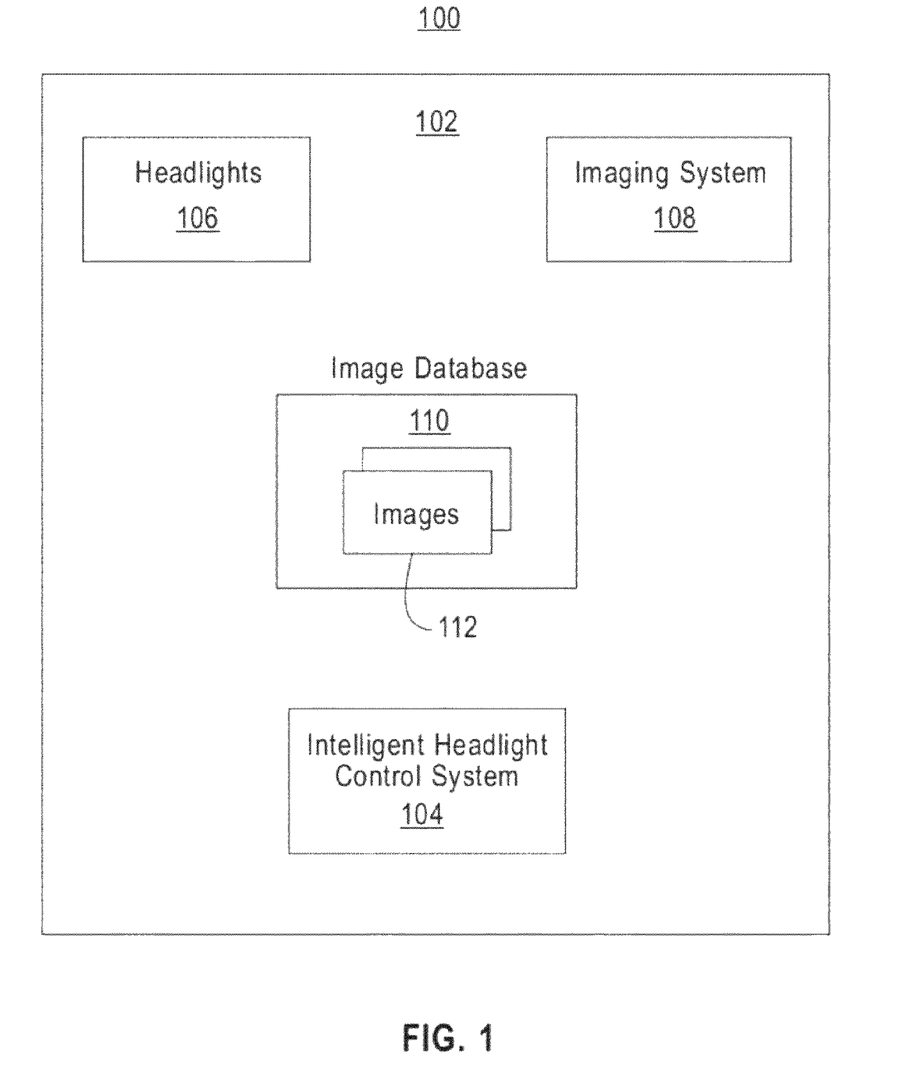
FIG. 1 is a block diagram illustrating a high level overview of a system for performing intelligent headlight control according to one embodiment of the present invention.

According to one embodiment, FIG. 1 illustrates a general overview of one operating environment 100 according to one embodiment of the present invention. In particular, FIG. 1 shows a vehicle 102 such as an automobile, motorcycle, and the like. The vehicle 102 includes, among other things, an intelligent headlight control system (IHCS) 104, headlights 106, an imaging system 108, and an image database 110 comprising one or more images 112.

The IHCS 104, in one embodiment, operates in real time to intelligently control the current state (such as a low beam state or a high beam state) of the headlights 106. For example, the IHCS 104, in one embodiment, detects oncoming and leading traffic as far as 1000 meters and 400 meters away, respectively, on straight and flat roads under dry weather condition. When there is an overtaking vehicle, the IHCS 104 switches to the low beam as soon as possible. The IHCS 104 is also able to detect urban area environments, which are considered well-lit areas with street lights.

In terms of system response time, the IHCS 104 can correctly turn to low beam within 2 seconds when the oncoming traffic is beyond 1000 meters, and 0.25 second when it is as close as 100 meters. Similar targets are defined for leading traffic except that 400 meters is used as the upper limit. Finally, when oncoming traffic passes by or the leading traffic goes beyond 400 meters, the IHCS 104 is able to switch back to high beam within 1 second. It should be noted that the various embodiments of the present invention are not limited to these parameters and the IHCS 104 is able to operate within other parameters as well.

Detailed View of the IHCS

Figure 2:
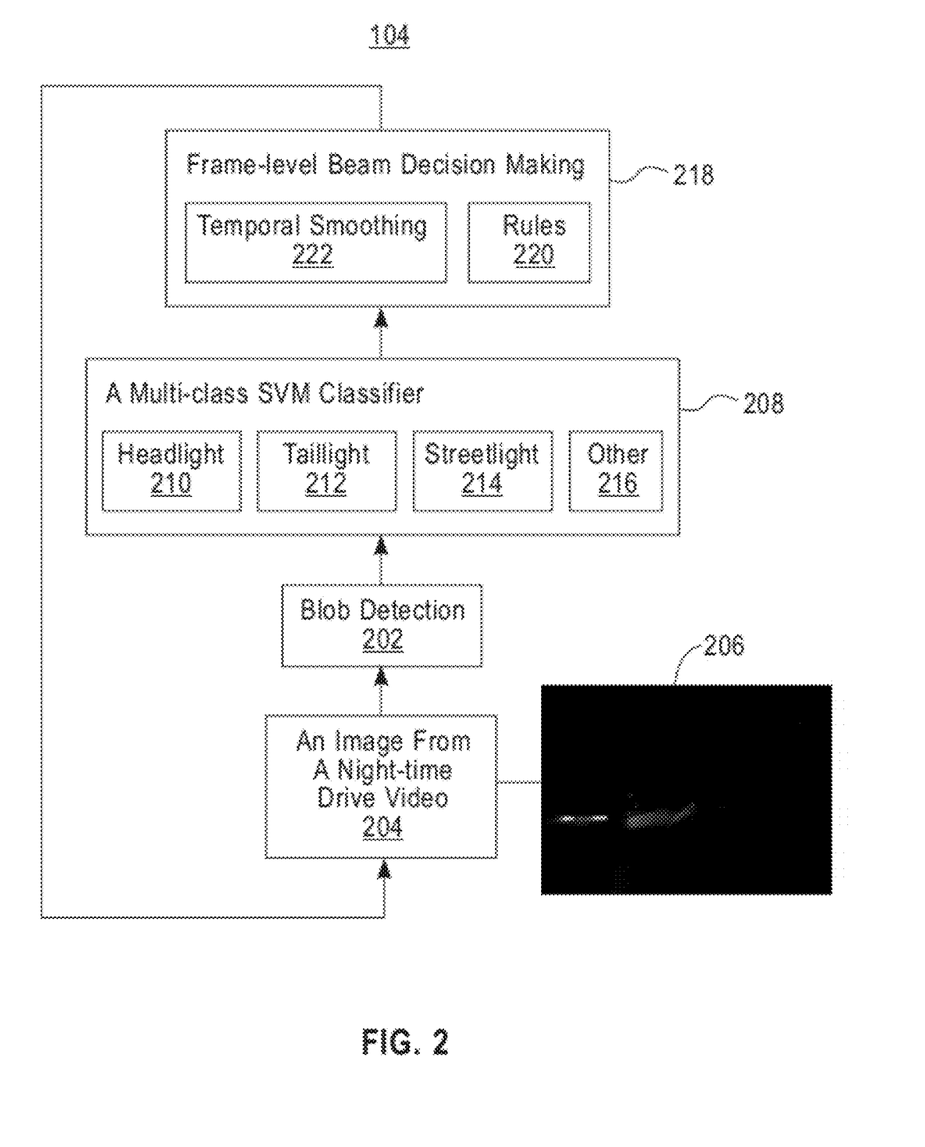
FIG. 2 is a block diagram illustrating a more detailed view of the system of FIG. 1 according to one embodiment of the present invention.

To achieve the above objectives, the IHCS 104 comprises a multi-level decision framework as shown in FIG. 2. Specifically, the first level includes a blob detection module 202 which, given an image 204 from a night-time drive video, applies connected component analysis to find bright spots that stand out from the dark background within each frame. Note that the video here could be either an offline one or taken at real-time. The image 206 shown in FIG. 2 includes a leading vehicle with two taillights.

The second level includes a multi-class SVM (Support Vector Machine) classifier 208 that applies an SVM learning approach to recognize different image blobs, which include candidates of headlight 210, taillight 212, streetlight 214, and other objects 216. Note that the other object category 216 mainly includes those infrastructure elements such as traffic signs, road reflectors, poles, fences, etc. that reflect light such as the light emitted by a vehicle. Nevertheless, this category 216 can also include objects that light up by themselves such as store signs. The multi-class SVM classifier 208, in one embodiment, is pre-trained for this purpose.

Finally, in the third level a frame-level decision making process 218 is carried out to determine the actual beam state (i.e., high beam or low beam) of the vehicle for the current frame based on both SVM classification result and a set of rules 220. A temporal smoothing process 222 is employed in this case so to ensure an un-abrupt beam change.

Blob Detection

The following is a more detailed discussion on the blob detection module 202 of the IHCS 104. This module 202 applies a standard connected component analysis to identify bright spots in an image 204. These blobs are then passed onto the SVM classifier layer 208 for type recognition. Note that by applying such spatial attention function at the first level of the IHCS 104, a substantial computational effort can be saved from running the classification engine at all possible positions, scales, or orientations within the image.

Figure 3:
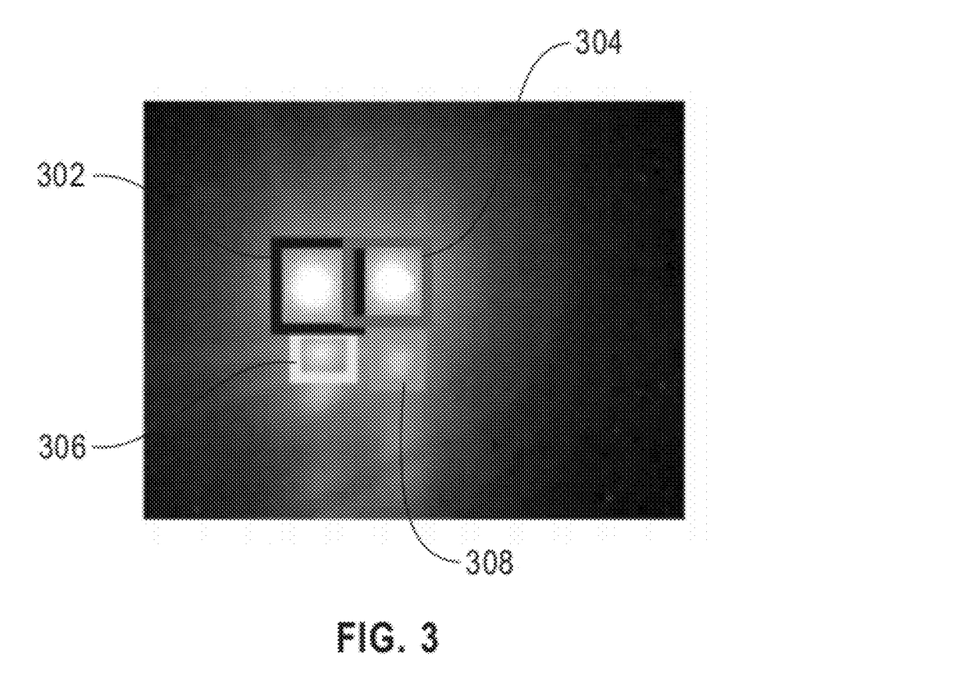
FIG. 3 illustrates detected blobs from headlights and their road reflections according to one embodiment of the present invention.
Figure 4:
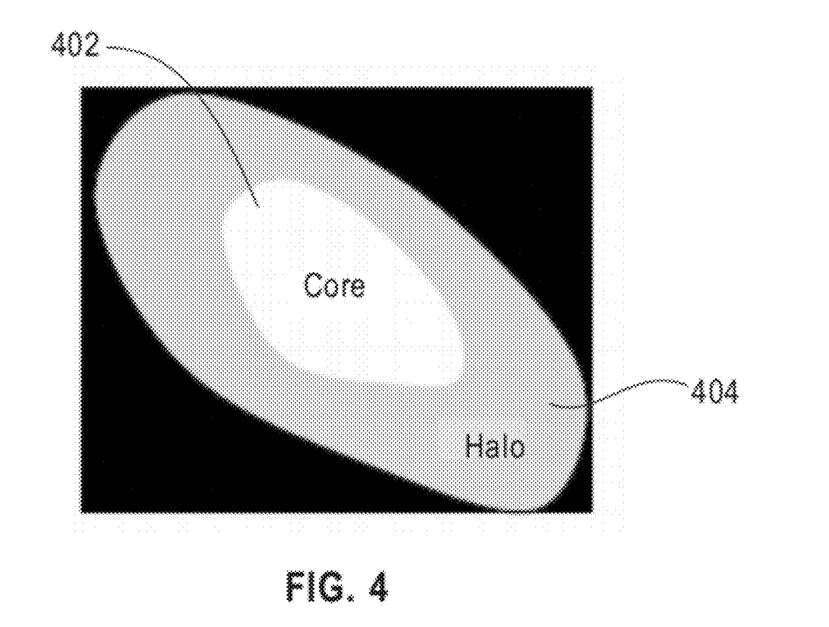
FIG. 4 illustrates a blob structure according to one embodiment of the present invention.

Two thresholds are used in such detection process: $T_0$, which thresholds all pixels that form the blob, and $T_1$, which thresholds the "core" pixels within the blob. As the core part 402 is generally brighter than its surrounding part (which is referred to "halo" 404) within a blob, $T_1$ is set to be slightly larger than $T_0$. FIG. 3 shows an example of detected blobs (indicated by bounding boxes 302, 304, 306, 308) resulted from two headlights and their road reflections, and FIG. 4 shows the structure of a magnified blob. The last step of this module 202 is to filter out blobs whose area is either too large or too small, so as to further limit this set to potential headlights, taillights, and street lights.

SVM Based Blob Learning and Classification

The following is a more detailed discussion on the multi-class SVM classifier 208. Two phases are involved in this module 208: SVM training and SVM classification. In one embodiment, the training phase produces a multi-class SVM model, which has learned the following four different types of blobs: headlight 210, taillight 212, streetlight 214, and other 216. The classification phase then uses such model to recognize the type for an unknown blob.

Figure 5:
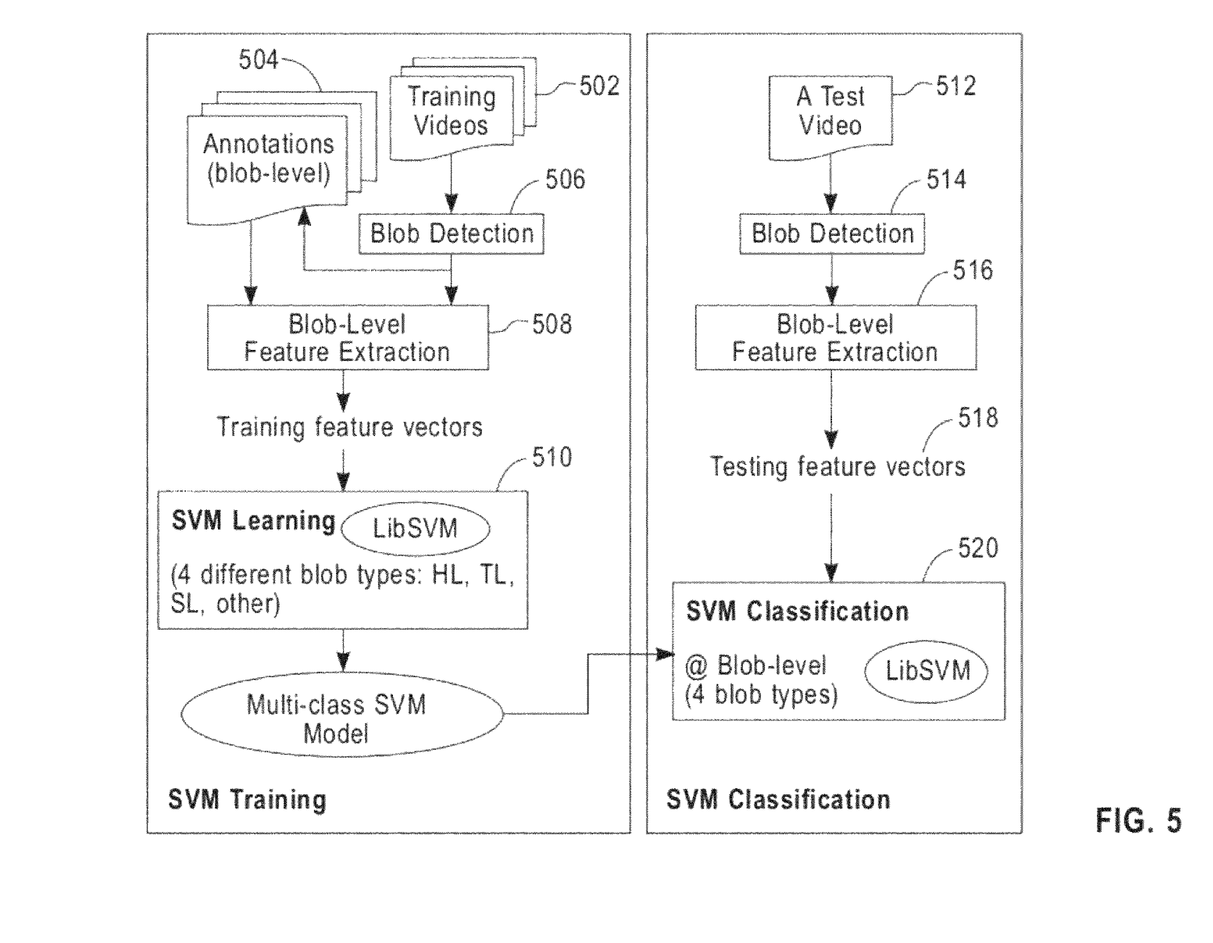
FIG. 5 is an operational flow chart illustrating Support Vector Machine training and classification according to one embodiment of the present invention.

FIG. 5 illustrates a flowchart for the above two processes. Specifically, during the training phase, a set of videos, at step 502, is identified that include representative data in terms of objects of interest. Qualified blobs are then detected within each frame, at step 506, and their types are manually annotated, at step 504. Next, at step 508, a list of features is extracted from each detected blob. Such feature vectors (plus the proper class labels) are then used as training samples for SVM learning at step 510. In one embodiment, the LibSVM tool (See, for example, C. C. Chang and C. J. Lin, "LIBSVM-A library for support vector machines," [(http://www.csie.ntu.edu.tw/cjlin/libsvm)], which is hereby incorporated by reference in its entirety), can be used.

During the classification phase, given a test video 512, blob detection and feature extraction, as discussed above, are performed, at steps 514 and 516, respectively, to form testing feature vectors, at step 518. Then the SVM classifier 208 such as the LibSVM tool, at step 520, recognizes each blob type using the pre-trained SVM model.

SVM Feature Extraction

In total, 37 features are extracted for each image blob, which can be grouped into 6 categories as follows. However, it should be noted that more or less features and categories can be utilized as well. The first category is "Position Features", which include the x and y coordinates of the gravitational centroid of the blob. This is motivated by the observation that lights from different traffic (oncoming, leading, crossing) and from street lamps are generally located at different spatial locations within the image. The challenge is when headlights, taillights, and street lights are far away, they all appear to be close to the vanishing point.

The second category is "Brightness Features", which include the average and variance of intensity of all pixels within the blob. The intuition is that, close-by light objects are generally brighter than far away objects or reflected objects. Also, headlights are generally brighter than taillights. The challenge is, sometimes, reflected objects could be very bright which causes potential false positives.

The third category is "Shape Features", which describe a blob's shape in 20 different aspects. Specifically, they include: the area of the blob (in unit of pixels); the ratio of the blob area over the size of its bounding box; the aspect ratio and angle of the blob, which are calculated from the moments; the average and variance of the blob's radius; the average and variance of the blob's diameter; ratio of the major axis to the minor axis; four types of eccentricity features calculated from blob's major and minor axis information (See, for example, Wikipedia, "Eccentricity in mathematics," Available at [(http://en.wikipedia.org/wiki/Eccentricity)] (mathematics), which is hereby incorporated by reference in its entirety); shape of the blob's horizontal projection (See, for example, M. Sonka, V. Hlavac, and R. Boyle, *Image Processing, Analysis, and Machine Vision, Second Edition.* Brooks/Cole, 2002, which is hereby incorporated by reference in its entirety), which is categorized into either modal-less, uni-modal, bi-modal or multi-modal; shape of the blob's vertical projection; compactness of the blob, defined as the square of blob's border length over its area (See Id.); size of the halo, and ratio of the halo over the blob's area.

The intuition for selecting these shape features is that, blobs corresponding to the headlight, taillight and streetlight usually appear to be round in the image, although their actual shapes could be slightly different. Nevertheless, blobs for other objects are likely to be of irregular shapes. The challenge here is that, the spots on the objects being reflected tend to be of round shape as well.

The fourth category is "Spatial Relation Features", which describes the spatial relationship among image blobs. This is motivated by the observation that in most cases, headlights or taillights are in pairs (as shown in FIG. 3), while street lights are generally lined up along roadside in multitude. Consequently, one embodiment extracts some features to capture such spatial relationship among blobs based on both pair analysis and line (or slightly curved line) analysis. For instance, the number of buddies for a blob within detected group, which could be either 2 (for a pair), or 3 (for a detected line), or nothing; the mathematical representation of each detected line including its gradient, its perpendicular distance r to the origin, and the angle between r and the x-axis. One embodiment, also calculates the horizontal and vertical distances between the two ends of the line or pair.

Some of these spatial relation features have turned out to be very effective, as will be seen from the feature saliency analysis, nevertheless, challenges still exist. For instance, some urban areas have very sparsely distributed street lights; therefore, one embodiment may only find one or two street lights within each frame.

The fifth category is "Color Features", which describe the dominant hue (H), average saturation (S) and average value (V) of each blob. Since different types of lights generally present different colors, for instance, taillight is reddish, headlight is usually bright white, while street lights could be yellow. Therefore, color features can be a big help for SVM learning.

The sixth category is "Motion features", which describe the trajectory of each blob from frame to frame. This is motivated by the observation that headlight, taillight, and streetlight generally have different moving directions. For instance, headlights are moving towards us, taillights are moving forward, while street lights are normally moving outwards. Five features, in this embodiment, are extracted for this category including the motion displacement and moving speed in both x and y directions, respectively, as well as the moving direction of the blob. The motion features could be very useful. It should be noted that more or less motion features can be extracted.

Frame-Level Beam Decision Making

Using the blob recognition result obtained from the process discussed above, the frame-level beam decision module 218 of the IHCS 104 performs the final decision: (e.g. shall I turn on high beam or low beam for this particular frame?). The following discussion elaborates on the decision making mechanism, which, in one embodiment, is built upon a temporal smoothing process and a set of rules.

For the ease of illustration, it is assumed that each frame f has two beam states, the hidden state (HS) and the actual display state (DS). The difference between these two states is that, HS is determined based on what is happening in the current frame, while DS is determined based on not only the current moment, but also the past. In another word, it takes history into account.

The process of determining the HS of frame f is now discussed. If there is at least 1 headlight or 1 taillight, or 3 streetlight blobs detected in frame f, then $HS_f$ is low beam.

Note that the 3-streetlight heuristics is only one example and other heuristics can be utilized as well. In this example, an urban area is defined as the place that has 3 or more street lights. In reality, strictly following such urban rule results in decision errors, which will be detailed later.

If frame f includes more blobs than a pre-defined threshold (which is set to 15, in one example, based on experiments), $HS_f$ is set to low beam. This comes from the observation that in urban areas, there are usually many city lights which results in a lot more blobs than in videos containing only dark country roads.

Figure 6:
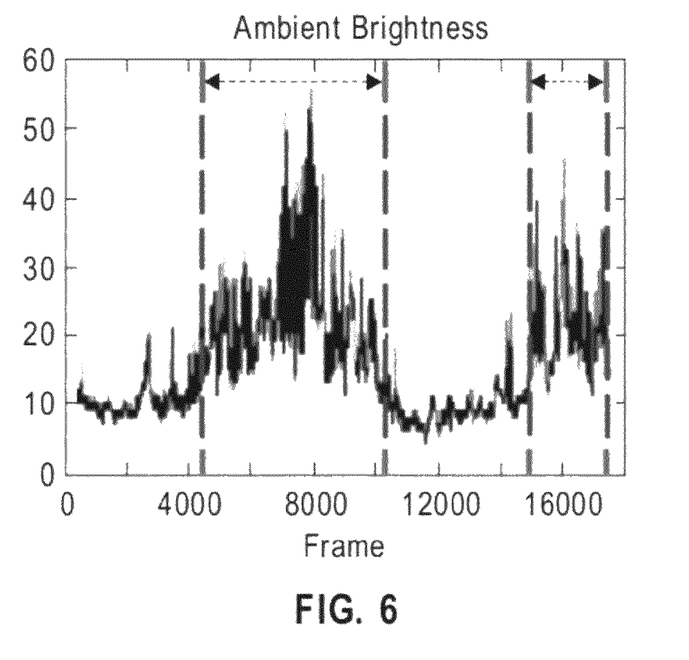
FIG. 6 is a graph illustrating a plot of ambient brightness of a test video according to one embodiment of the present invention.
Figure 7:
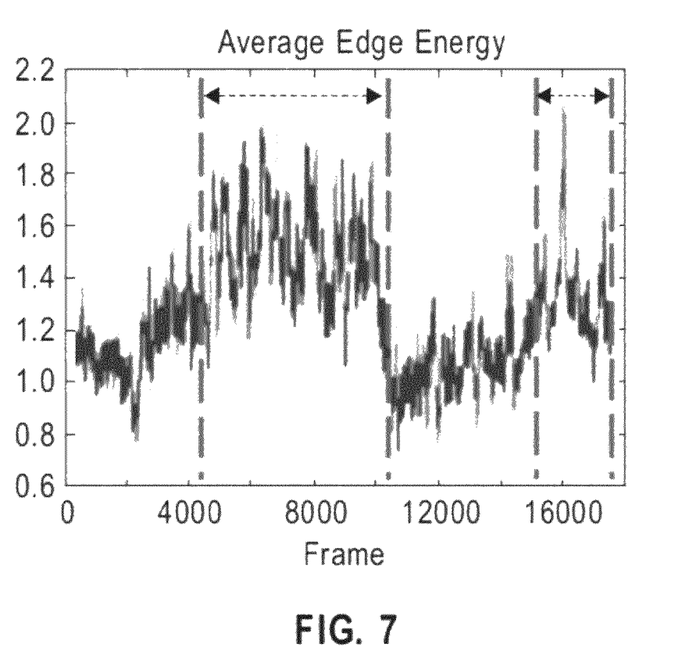
FIG. 7 is a graph illustrating a plot of the average edge energy of a test video according to one embodiment of the present invention.

If the product of the ambient brightness and the average edge energy in frame f is greater than a pre-defined threshold (which is set to 30, in one example, based on experiments), $HS_f$ is set to low beam. This is based on the observation that a well-illuminated urban area usually demonstrates a higher amount of ambient light than other situations. Moreover, due to the existence of buildings in urban areas, more edges are normally observed in such videos. FIG. 6 shows the plot for the ambient brightness and FIG. 7 shows the plot for the average edge energy of a test video. Specifically, this video includes two sections of urban driving as indicated. From the figure, it is seen that, both plots have shown increased values during these two urban periods.

Next, the process for determining frame f's DS is discussed. The following reality factors as well as heuristics are taken into consideration. The beam change should not be too frequent, i.e., there should be an acceptable temporal period between two consecutive beam changes, otherwise, it becomes annoying. Currently, one embodiment sets such temporal period to be equal with the video's frame rate fps. During implementation, one embodiment uses variable gapCount to track the number of frames between two beam changes.

As blob recognition errors are unavoidable, the following two ways can be used to solve such issue: 1) the final beam decision is not made solely based on the current frame; instead, one embodiment applies a temporal smoothing process to take the beam "history" into account. A sliding window of size fps is used for this purpose; 2) once the low-beam state is reached due to the detection of headlight, taillight, or streetlight, such light objects are tracked from frame to frame so that a few missed detection will not affect the decision. Consequently, as long as the objects are consistently tracked, a consistent beam decision will be maintained.

With the above considerations in mind, the four steps for determining frame f's DS state are now discussed in the following.

1) If frame f's HS is the same as its preceding frame's DS, then the HS is directly displayed without any change. This is the most desired scenario.

2) If there is only a beam change within a second, i.e., gapCount<fps, then no matter what is f's HS, the IHCS 104 maintains the existing beam state. No change is allowed in this case.

3) If the existing beam state is low beam, which has been on for more than a second and if the current frame's $HS_f$ votes for high beam, then the detected light objects (headlight, taillight, or streetlight) from the previous frame are tracked. If the tracking is successful, the IHCS 104 continues with the low beam.

4) If a beam change is likely needed to this stage, this decision is confirmed by polling the history. Specifically, the HS state of all frames is checked in the sliding window that covers the last one second, and then it is determined if a certain percentage of them have the same HS as such $HS_f$. If yes, a change decision will be confirmed, and $DS_f$ is set to $HS_f$. Otherwise, the existing state, i.e., $DS_f = DS_{f-1}$ is maintained.

A threshold $T_c$ is applied in this process, which is assigned to different values depending on different situations. Specifically, if the beam is changed from low to high, then $T_c$ is set to 0.8, in another word, 80% of preceding frames in the window have to support such $HS_f$ in order to make the change happen. On the contrary, if the beam is potentially changed from high to low, then $T_c$ is set to 0.3, meaning that only fewer preceding frames are needed to support such change. The theory behind such varying preference is that, a quicker response is desired to switch from high beam to low beam, so as to avoid dazzling other drivers. On the hand other, when it comes to switch from low beam to high beam, a more assured decision is preferred by examining a few more frames.

Figure 8:
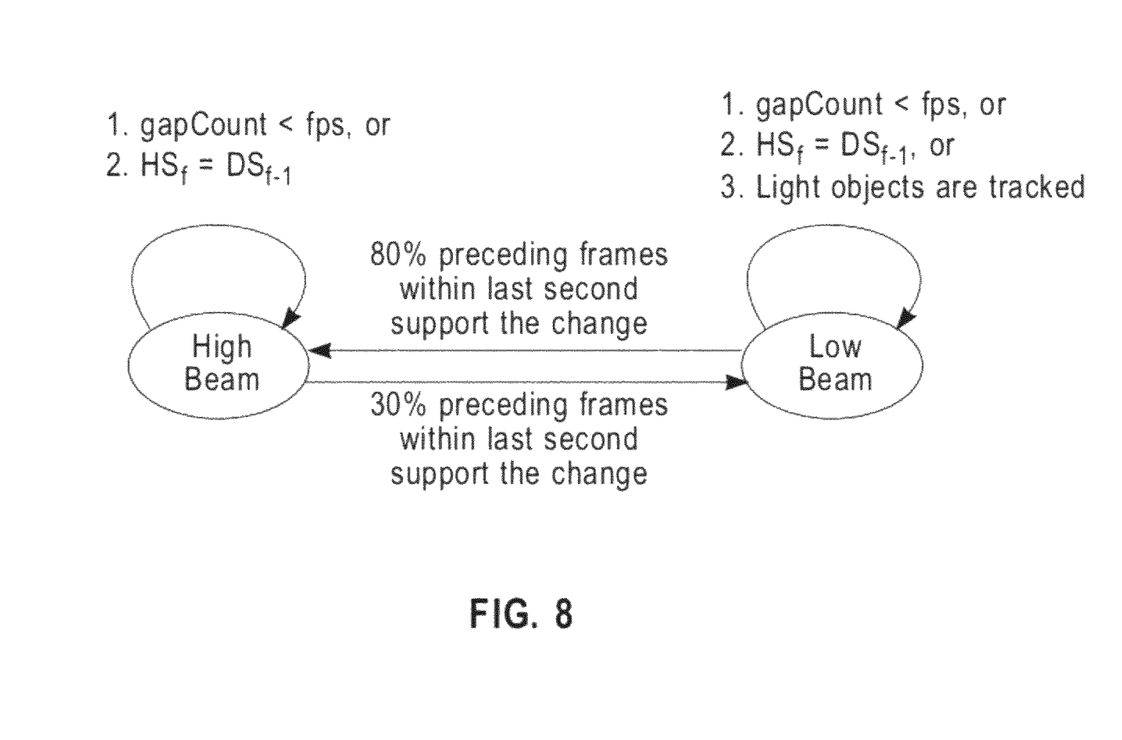
FIG. 8 is transition diagram between two beam states according to one embodiment of the present invention.

FIG. 8 summarizes the conditional transitions between the two beam states, where all required conditions as described above are listed along with each edge.

Additional Rules

Two additional rules, namely, curved rule and urban rule, are applied, in one embodiment, to further improve the system performance. As the name implies, the curved rule is particularly applied to the scenario where the road becomes curved or when there is a roundabout. In such scenario, the tracking of the streetlight and taillight can become lost, which have been visible when the road was straight. This situation is possible due to a camera being fixedly mounted on top of the windshield of a vehicle. In such a case the camera normally "looks for" things that are straight ahead in its field of view. Therefore, this rule is applied to accommodate for such situations. Note that, however, in certain embodiments, it is anticipated that a camera may not necessarily be fixedly mounted on the vehicle. A movable (or scanning) camera mounted on the vehicle may adjust its field of view and thereby provide alternative views of the road ahead as the road becomes curved or when there is a roundabout, which would change the tracking mechanisms and rules used in such a vehicle configuration.

During implementation, one embodiment first derives such road condition status from the steering angle value, which is a part of CAN bus information embedded within each frame. Then the IHCS 104 monitors the change of such value. Once it is above certain threshold (which is set to 60 in one embodiment of the current system), the IHCS 104 declares that a curved road is identified, and maintains the detection of street lights and taillights if they were previously recognized. The IHCS 104 continues such "assumed" recognition until the road goes back to straight. After that, the IHCS 104 resumes the normal beam decision process as discussed earlier.

On the other hand, the urban rule is applied to improve the robustness of urban detection. As pointed out earlier, if the IHCS 104 strictly follows the "3-streetlight" urban definition, the IHCS 104 may miss some urban areas due to: 1) un-robust street light detection; and 2) sparsely distributed street lights. In fact, some urban areas are very poorly illuminated. In these cases, the driver has to make the judgment based on his/her sight of buildings and parked cars along the road. To handle such situation, the IHCS 104 attempts to be more tolerant once the vehicle is within detected urban areas. More specifically, as long as the number of detected street lights is greater than 1, or the product of the ambient brightness and the average edge energy is above certain threshold (which is set to 10 currently in one example), the vehicles remains to be in the urban area.

System Setup

The following is one example of how the system of FIG. 1 can be configured. It should be noted that the system can be configured using many different configurations and parameters. A high dynamic range camera is used in one embodiment, which captures colored video at 640×480 resolution, 42°×31.5° field of view, with 35 frames per second. The camera works with 12 bits per pixel using a logarithmic curve, which is essential to avoid fully saturated light spots. The camera, in one embodiment, is mounted on the windshield right behind the rear mirror, and its captured video is processed by an information processing system installed on the car. After analyzing the video, the information processing system sends the beam decision to the CAN bus (Controller-area network) controller, which finally puts it into real action.

The system, in a test implementation of this embodiment, has been evaluated in both online and offline mode. The results of these initial tests of such an implementation will be discussed below, with an understanding that these test results should be considered only for general informational reference and not for any limitation of performance of this or other embodiments of the present invention. Specifically, the online mode refers to observing the system performance at real time when taking the host car for a drive. In this case, the performance is evaluated more qualitatively and subjectively. For the offline mode, the system was tested using tens of night-drive videos recorded under dry weather, various road conditions and in changing urban and country-side scenarios. Three different metrics were then defined to measure the performance.

Performance Metrics

The offline system performance is measured in terms of false negative value (FNV), false positive value (FPV) and overall errors. Specifically, the false negative value (FNV) is calculated as:

$$FNV = \sum_{k=1}^{MD} \eta |t_k^{off} - t_k^{on}| + \sum_{i=1}^{LD} \delta_i \eta |t_i - t_0| + \sum_{j=1}^{EA} \delta_j \eta |t_j - t_0| + \sum_{k=1}^{FA} \eta |t_k^{on} - t_k^{off}|, \quad (1)$$

where MD, LD, EA and FA stand for missing deactivation}, late deactivation, early activation, and false activation, respectively. These are four typical types of false negatives that leave high beam on by mistake. Moreover, $t_0$ indicates the ideal switching moment given by the ground truth, $t_i$ and $t_j$ are the switching moments indicated by the system. For a missing deactivation, $t_k^{off}$ is the time when the high beam should have been deactivated, and $t_k^{on}$ is the time when the high beam should have been re-activated. They are similarly defined for the case of false activation as well. On the other hand, considering that there is even variance between two human drivers in terms of beam switching, one or more embodiments use $\delta_i$ and $\delta_j$ to accommodate for some tolerable variance (Δ) between a system decision and a human decision. Specifically, when Δ is greater than 0.25 second, $\delta_i$ and $\delta_j$ are set to 1, otherwise, 0. Finally, η is a weighting factor, which specifies how strongly each item should be punished. For now, it is set to be 1/Δ, which however, is being investigated for a more reasonable value for each individual item.

Similarly, the false positive value (FPV) is defined as follows.

$$FPV = \sum_{k=1}^{FD} \eta |t_k^{off} - t_k^{on}| + \sum_{i=1}^{LA} \delta_i \eta |t_i - t_0| + \sum_{j=1}^{ED} \delta_j \eta |t_j - t_0| + \sum_{k=1}^{MA} \eta |t_k^{on} - t_k^{off}|, \quad (2)$$

where FD, LA, ED, and MA stand for false deactivation, late activation, early deactivation, and missing activation, respectively. These are four typical types of false positives that leave low beam on by mistake.

Finally, the overall error function is defined as $$\text{Error} = 10 \times FNV + FPV, \quad (3)$$

which clearly states that false negatives are more un-tolerable than false positives. This also explains why different values are assigned to the threshold $T_c$ during the decision making process.

Performance Report

The SVM model used for all performance evaluation is trained using 29 videos, which amounts to 30 minutes in total. The number of headlight (HL), taillight (TL), and streetlight (SL) objects annotated for this training set are tabulated in Table 1 below. Moreover, the distinct or unique number of HL, TL and SL are also reported, which gives readers a rough idea of how many oncoming/leading vehicles as well as unique street lights are contained in this set.

TABLE 1

| Statistics of the training set. | |
|---|---|
| Number of HL objects | 9773 |
| Number of TL objects | 12192 |
| Number of SL objects | 8462 |
| Number of unique HL objects | 93 |
| Number of unique TL objects | 15 |
| Number of unique SL objects | 46 |

One interesting observation from Table 1 is that while there is a fairly large number of taillight objects, the unique number of taillights is much smaller than others. This is due to the fact that some videos include the same leading vehicle throughout the entire trip, thus producing as few as 2 distinct taillights. On the other hand, when the videos were chosen for training, the inventors strived to obtain as many unique light objects as possible, so that the SVM model can learn diverse types of headlight, taillight, and streetlight.

Below, the system performance is reported in the following two dimensions: 1) the blob classification performance; and 2) the IHC system performance, as both are considered important measurements. Moreover, all test videos are from a different set than the training videos.

For the former evaluation, 12 pre-annotated videos were selected and their blob-level SVM classification results were measured against the ground truth in terms of false rejection (FR) and false acceptance (FA). Specifically, the FR and FA were calculated for each object class from the confusion matrix constructed for each test video. One such example is shown in Table 2 below, where each row indicates a true class while each column indicates a predicted class.

TABLE 2

The confusion matrix for one test video.

|  | Other | HL | TL | SL | F. Reject |
|---|---|---|---|---|---|
| Other | 2443 | 26 | 0 | 102 | 0.05 |
| HL | 133 | 503 | 0 | 0 | 0.21 |
| TL | 24 | 0 | 128 | 0 | 0.16 |
| SL | 114 | 0 | 0 | 698 | 0.14 |
| F. Accept | 0.10 | 0.05 | 0 | 0.13 | |

Table 3 below tabulates the measurements for the 12 test videos, where the FA and FR averaged over the 4 classes are reported for each video, along with the classification accuracy (CA). From the table, it is seen that the average blob classification accuracy is around 90%, and the average false rejection and false acceptance are both 0.1, which is quite acceptable.

TABLE 3

Performance of the SVM classifier, where FR, FA and CA stand for false rejection, false acceptance and blob classification accuracy, respectively.

| Video | length (sec) | Avg. FR | Avg. FA | CA |
|---|---|---|---|---|
| Video 1 | 37 | 0.158 | 0.202 | 81% |
| Video 2 | 40 | 0.14 | 0.07 | 90% |
| Video 3 | 100 | 0.06 | 0.09 | 93% |
| Video 4 | 28 | 0.087 | 0.103 | 91% |
| Video 5 | 84 | 0.103 | 0.103 | 90% |
| Video 6 | 97 | 0.08 | 0.063 | 92% |
| Video 7 | 28 | 0.1 | 0.083 | 90% |
| Video 8 | 51 | 0.08 | 0.083 | 90% |
| Video 9 | 48 | 0.103 | 0.108 | 89% |
| Video 10 | 51 | 0.098 | 0.078 | 93% |
| Video 11 | 48 | 0.14 | 0.1 | 84% |
| Video 12 | 150 | 0.107 | 0.127 | 91% |
| Average | | 0.104 | 0.10 | 89.5% |

The performance of this particular test implementation of an IHC system is now reported. The overall impressions of the system obtained from both online and offline evaluation are: 1) for most of the time, it quickly switches to low beam with oncoming traffic; 2) it performs generally well in well-illuminated urban areas; 3) it fails to recognize leading traffic in a distance (yet still within the targeted 400 meter range); and 4) on curved road, it tends to generate false positives due to road reflectors and traffic signs.

Table 4 below presents a more quantitative measurement, which tabulates the results for 13 test videos. Specifically, the first 6 videos are randomly selected from the test set, while the next 7 are carefully chosen due to the diverse and challenging driving conditions contained within them. All used ground truth in this case, were pre-collected during the video capturing process, which basically records the beam decisions that the driver is taking during the drive.

To examine the results from multiple aspects, not only have the FNV, FPV and error values been reported, but also the number of FN and FP for a more straightforward comparison. Note that all performance data has been normalized by the video duration, except the "Error/switch" which indicates the amount of errors per switching event. Such normalization takes into account how "busy" the video is in terms of needed beam switching.

TABLE 4

AHC performance evaluation on 13 videos.

| Video | Length (min) | No. FN/min | No. FP/min | FNV/min | FPV/min | Error/min | Error/switch |
|---|---|---|---|---|---|---|---|
| Video 1 | 4.2 | 2.1 | 0.3 | 14.5 | 8.1 | 153.3 | 49.2 |
| Video 2 | 3.3 | 0.9 | 1.5 | 2.7 | 24 | 50.5 | 18.7 |
| Video 3 | 3.27 | 0.92 | 0.3 | 13.1 | 1.0 | 132.1 | 143.9 |
| Video 4 | 1.5 | 0 | 0 | 0 | 0 | 0 | 0 |
| Video 5 | 1.2 | 0 | 0 | 0 | 0 | 0 | 0 |
| Video 6 | 1.9 | 0 | 0 | 0 | 0 | 0 | 0 |
| Video 7 | 4.6 | 1.74 | 0.43 | 40.3 | 5.2 | 406.2 | 268.6 |
| Video 8 | 5.3 | 2.8 | 1.69 | 66.5 | 24.6 | 686.53 | 174.16 |
| Video 9 | 4.6 | 4.13 | 1.08 | 57.6 | 7.7 | 583.6 | 99.5 |
| Video 10 | 8.4 | 0.59 | 0.71 | 31.4 | 10.0 | 326.5 | 544.4 |
| Video 11 | 3.8 | 2.14 | 4.28 | 31.1 | 35.2 | 346.06 | 108.02 |
| Video 12 | 10.6 | 0.85 | 1.13 | 11.8 | 10.8 | 129.1 | 91.5 |
| Video 13 | 8.3 | 0.72 | 1.8 | 12.5 | 16.2 | 140.58 | 78.13 |

A detailed system performance analysis is now given in terms of various scenarios that have caused false positives and false negatives. Meanwhile, a deeper look is taken at the evaluation results presented in Table 4. The false positive scenarios are firs discussed below.

With respect to the false positive scenario of "Road reflectors on curved road", in the test videos there are reflective markers installed along the roadside for the safety and information purpose. Specifically, every 50 meters on the road, there would be two markers symmetrically lined up on each side. In this case, when the road becomes curvy right in front of the controlled vehicle, those reflective markers would appear like headlights of oncoming cars, thus triggering a low beam decision.

With respect to the false positive scenario of "Traffic signs on curved road", one typical scenario that almost always causes false positive is when the car directly faces a curved road that has a set of curve signs attached on the rail. These reflective signs contain directional arrows, and once they are directly shined upon, they tend to be recognized as headlights.

In contrast, false negatives tend to occur in the following scenarios. With respect to the false negative scenario of "Distant taillights", this is the number one reason that results in undesired high beams. Specifically, while the leading traffic is far away, yet still within reasonable "viewable" distance, this particular test system implementation appeared to fail to detect distant taillights, and switched on high beam. Referring back to Table 4, videos 7-11 all include heavy driving on a country road following some leading traffic, and due to the failure of recognizing distant taillights, thus a fairly large number of false negatives were observed. Examining further deeper into the test system behavior, it was discovered that most of these distant taillights were missed by the blob detector in the first place, due to their low intensities. This will be improved in next versions of blob detector for such a test system implementation.

With respect to the false negative scenario of "Dim urban areas", although various ways were tried to improve the detection accuracy in urban areas, yet the test system implementation still failed when they are really poorly illuminated. Especially, when the vehicle drives at the edge of a village where there are buildings on one side, yet fields on the other side, or when it just enters a village, the illumination condition is usually poor. In such cases, not only will no or fewer street lights be detected, but also not much edge or ambient light are present. Referring back to videos 12 and 13 in Table 4, both of them include heavy driving in urban areas, and most of their false negatives are caused by this reason.

Finally, a discussion on some other issues that potentially affected the test system performance and its evaluation is now given. The first issue is with respect to defects in the object annotation. It has already been observed that there are various types of defects in the annotation data. Specifically, some serious problems include: duplicate object ID for different objects, change of the blob type for the same object during the course of video, and un-annotated blobs that are headlight, taillight, or streetlight. Such mistakes in the annotation would unavoidably affect the trained model and consequently the classification result.

The second issue is with respect to the unbalanced nature of the training data. Table 5 below shows the actual number of training samples for the four object classes, respectively, for training three different SVM models. Specifically, model i (i=1, 2) is trained with a video subset of that of model i+1, and model 2 is the one being used in the current embodiment.

TABLE 5

Training statistics of three different SVM models.

|  | Model 1 | Model 2 | Model 3 |
| --- | --- | --- | --- |
| No. of training videos | 14 | 29 | 43 |
| Total duration (min) | 11.5 | 29.5 | 60 |
| No. of HL samples | 8917 | 32261 | 45350 |
| No. of TL samples | 5267 | 22356 | 26455 |
| No. of SL samples | 6719 | 55847 | 78392 |
| No. of Other samples | 22896 | 160720 | 304002 |

It is clear from this table that the amount of training data is not balanced among the four object classes for any of the above three models. Specifically, the training data of taillight is much less than that of headlight and streetlight, while on the contrary, the other object class has significantly too much data (especially for model 3). Such unbalanced nature of the training data has unavoidably affected the performance of the trained model.

Figure 9:
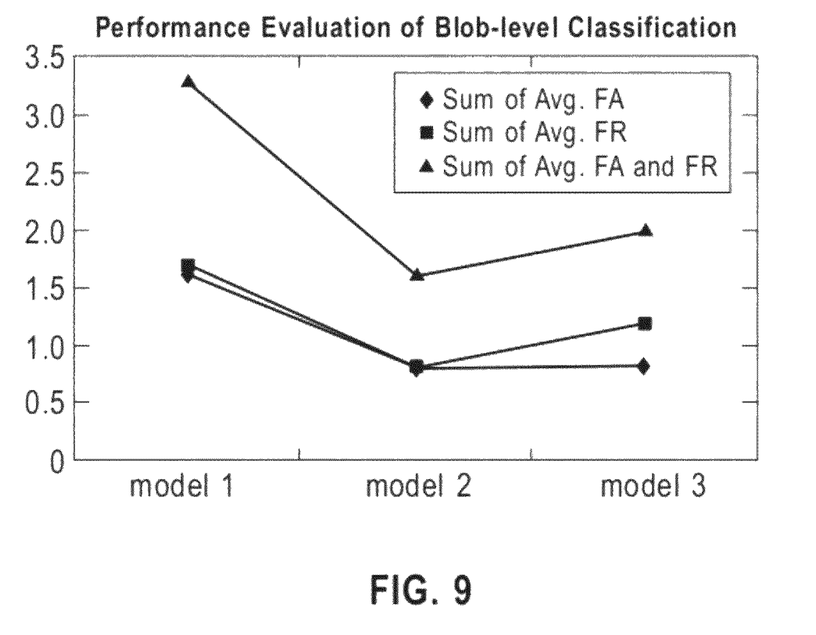
FIG. 9 is a graph illustrating a plot of a performance evaluation in terms of false acceptance and false rejection summed over each training set according to one embodiment of the present invention.
Figure 10:
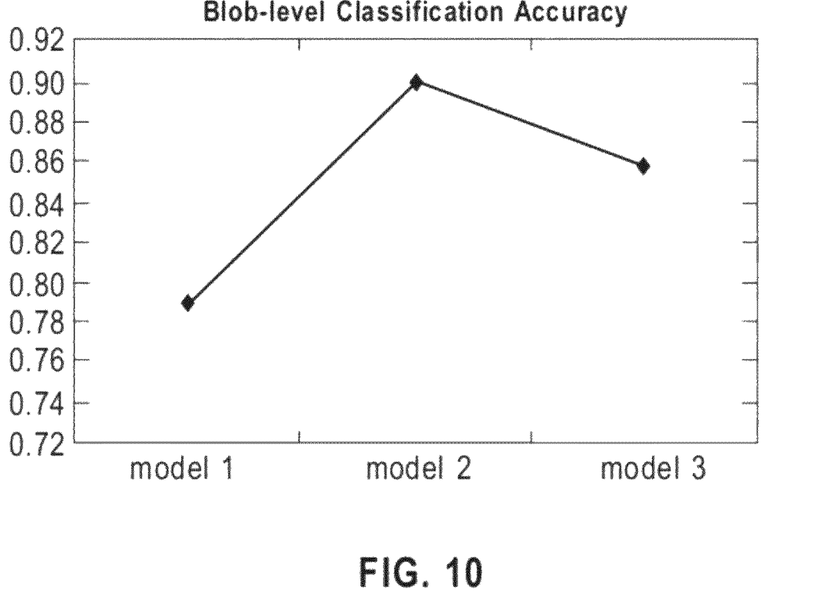
FIG. 10 is a graph illustrating a plot of a performance evaluation in terms of blob classification accuracy according to one embodiment of the present invention.

This also explains why model 2 is generally performing better than model 3 although it is trained with only half of the videos of model 3. FIGS. 9 and 10 shows the blob-level performance evaluation of the three models, where FIG. 9 compares the performance in terms overall false acceptance (FA) and false rejection (FR), while FIG. 10 compares the blob classification accuracy. Apparently, model 2 has outperformed the rest in each case.

The test system performance with each model was also measured, and the observation is, both models 2 and 3 have outperformed model 1. On the other hand, while model 2 still gives an overall better performance than model 3, the latter has fewer false positives.

With respect to the un-verified parameters ($\Delta$ and $\eta$) related to the performance metrics. Specifically, $\Delta$ is meant to capture the variance between different human drivers, which is currently set to 0.25 second. However, a study carried out to examine driver variance shows that it could go up to 2 seconds. In fact, it is also observed that there is even bigger variance between drivers from different countries, which shows that different driving styles and habits could contribute to such variance.

On the other hand, the same weight $\eta$ is being used for every possible situation of false positive and false negative, which might be inappropriate since that certain scenarios such as missing deactivation can be more severe than others such as late deactivation. Therefore, such weighting factor $\eta$ should be chosen more carefully for each scenario.

Feature Saliency Analysis

Finding the saliency or strength of each feature can be very helpful when there are constraints on the CPU and processing speed. Therefore, a feature saliency analysis was conducted based on the Chi-2 square test, which analyzes the correlation between a feature and the label of each training sample. The features are then ranked based on the degree of such correlation.

As a result, the top 10 features are: blob centroid (y), average brightness, ratio of the halo size, variance of brightness, number of buddies, the three color features, blob centroid (x), and aspect of the blob. In contrast, the bottom 10 features are: motion displacement in both x and y directions, the four eccentricity features, shape of the blob's vertical projection, variance of radius, halo size, and ratio of the blob area.

While it is expected that the position, brightness and color features are important ones, it is slightly surprising that the motion displacement features are among the bottom 10. Nevertheless, it is realized that when objects are far away, the calculated motion information would become inaccurate. On the other hand, since blobs may have all sorts of shapes, the eccentricity features, which are mainly designed for ellipses, do not really help.

Feature Correlation Analysis

To further investigate the correlation between features, the feature correlation analysis was performed based on the well-known intra-class ($S_{intra}$) and inter-class ($S_{inter}$) scattering matrices (See, for example, R. Duda, P. Hart, and D. Stork, *Pattern classification-Second Edition*. New York: John Wiley & Sons, INC, 2001, which is hereby incorporated by reference in its entirety). Specifically, once such two matrices are constructed, the diagonal entries in each matrix characterizes the intra- and inter-class separability of individual features, respectively. For instance, if a small diagonal entry in the intra-class matrix has a large value in the inter-class matrix, then very likely the corresponding feature has a good class separability. On the other hand, the off-diagonal entries in these two matrices reveal the correlation between different features.

For a more quantitative analysis, the following two analyses were conducted. In the first analysis, the ratio between inter-class distance and intra-class distance were calculated for each feature i, i.e., $$\frac{S_{inter}[i][i]}{S_{intra}[i][i]}.$$

Intuitively, the larger the ratio, the better the feature with a good class separability. Below are some features that are among the top: blob centroid (y), horizontal and vertical distances, the three color features, halo size ratio, and number of buddies. In contrast, features that are among the bottom include the four eccentricity features, motion displacement (x and y), shape of the blob's vertical projection, halo size, ratio of the blob area, variance of radius and blob angle. Now, if these two lists are compared with those obtained from the feature saliency analysis, one can see a good portion of overlap. While it is not a surprise, it is also an assuring confirmation.

In the second analysis, the correlation between two features i and j is calculated as $$\text{Correlation}(i, j) = \frac{S_{intra}(i, j)}{\sqrt{S_{intra}(i, i) \times S_{intra}(j, j)}}$$

All possible feature pairs are then sorted based on the above measurement, and the top 8 pairs that are tightly correlated in listed in Table 6 below. As one can see, some of them are fairly self-explainable.

TABLE 6

Feature pairs that are tightly correlated.

| Feature Pair | Correlation Value |
|---|---|
| Eccentricity feature 3 and 4 | 0.99 |
| Eccentricity feature 1 and 3 | 0.99 |
| Eccentricity feature 1 and 4 | 0.99 |
| Avg. radius and Avg. diameter | 0.99 |
| Var. radius and Var. diameter | 0.98 |
| Distance ratio and eccent. feature 2 | 0.96 |
| Blob area and avg. radius | 0.95 |
| Blob area and avg. diameter | 0.93 |
| Blob area and halo size | 0.84 |
| Avg. radius and halo size | 0.82 |
| Avg. diameter and halo size | 0.81 |

Based on both feature saliency and correlation analysis, some features can be excluded and some of the previous evaluations can be repeated to measure the impact. Examples of the features that can be excluded are the four eccentricity features, blob area ratio, halo size, average diameter and its variance, distance ratio (the ratio between the major axis and minor axis), blob angle and compactness.

One Example of a Process for Intelligently Controlling Headlights of a Vehicle

Figure 11:
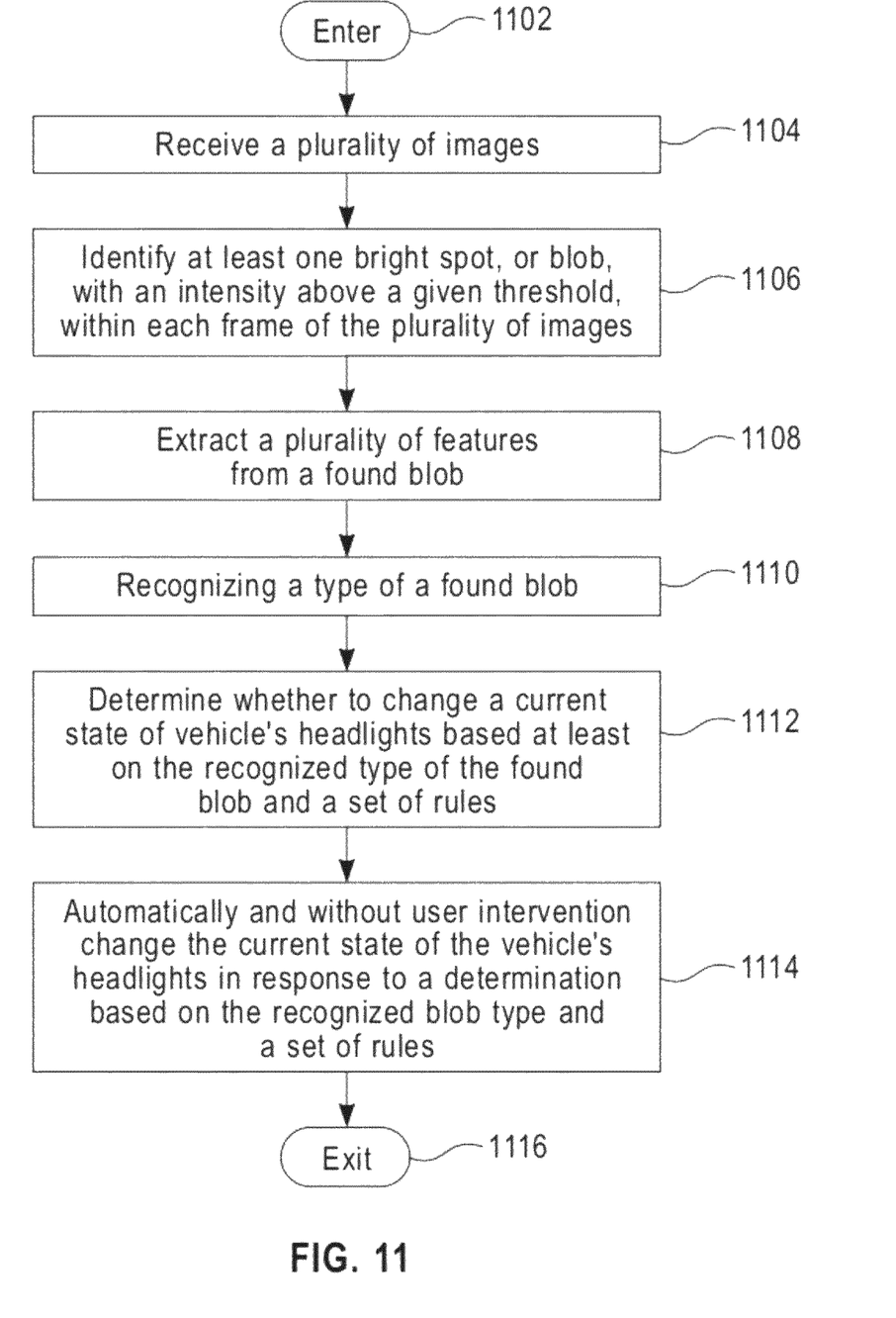
FIG. 11 is an operational flow diagram illustrating one process for intelligently and automatically controlling headlights of a vehicle.

FIG. 11 is an operational flow diagram illustrating a process for automatically and intelligently controlling the headlights of a vehicle according to one embodiment of the present invention. The operational flow diagram of FIG. 11 begins at step 1102 and flows directly to step 1104. The IHCS 104, at step 1104, receives a plurality of images 112 that represent frames of a video sequence of an external environment of a vehicle 102. The IHCS 104, at step 1106, identifies at least one bright spot or blob that has an intensity above a given threshold. For example, the IHCS 104 can identify a blob or a bright spot that stands out from a darker background of the external environment within each frame of the plurality of images 112.

The IHCS 104, at step 1108, extracts a plurality of features from a found blob. The IHCS 104, at step 1110, analyzes the features of the blob to recognize the blob type of the identified blob. This blob type can be selected from a plurality of blob types. The IHCS 104, at step 1112, then determines whether to change the current state of the vehicle's headlights 106 based on this identified blob type and a set of rules. For example, the IHCS 104 determines whether to turn on a high beam light, low beam light, or maintain the current headlight state. The IHCS 104, at step 1114, then automatically and without user intervention, changes the current state of the vehicle's headlights in response to the determination based on the recognized blob type and the set of rules. The control flow then exits at step 1116.

Information Processing System

Figure 12:
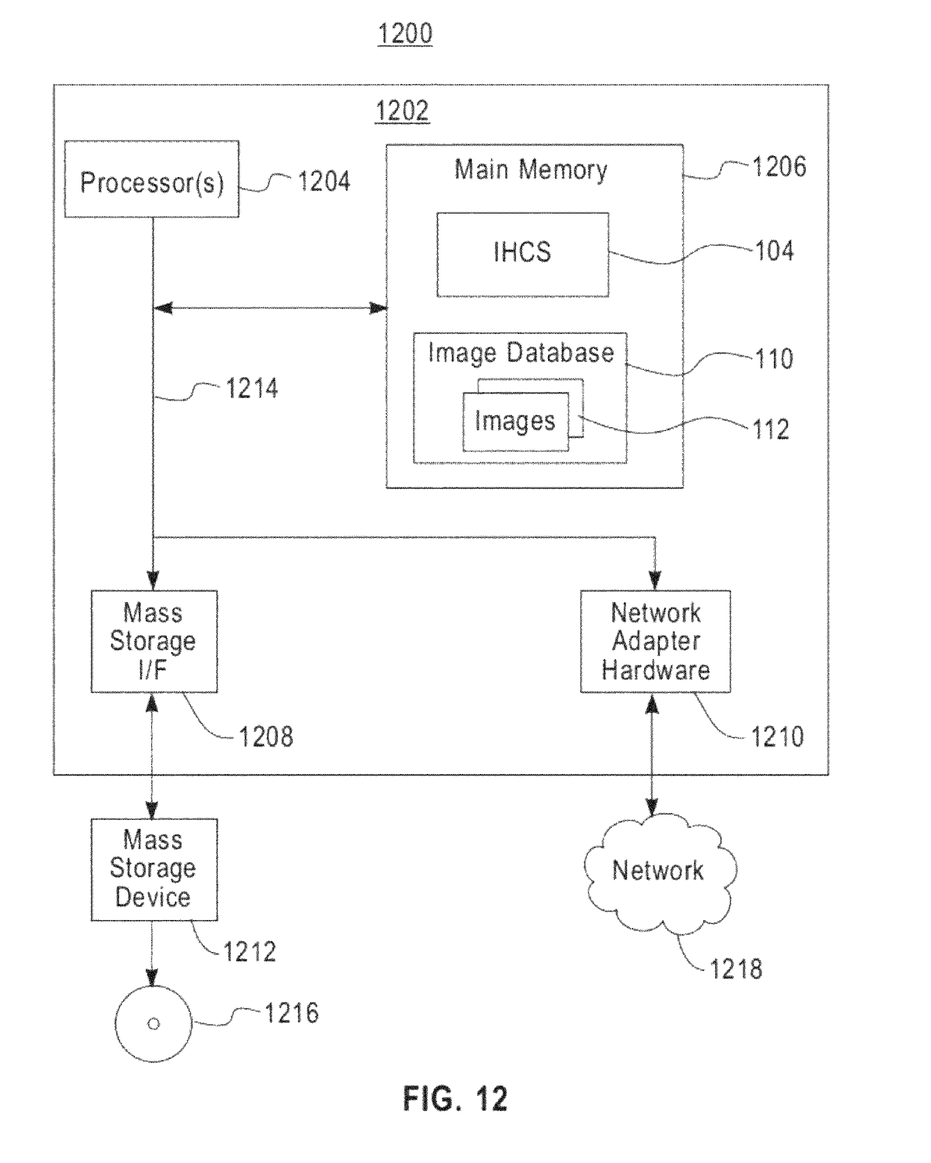
FIG. 12 is a block diagram illustrating a more detailed view of an information processing system according to one embodiment of the present invention.

FIG. 12 is a block diagram illustrating a more detailed view of an information processing system 1200 that can be utilized to perform one or more embodiments of the IHCS 104 of FIG. 1. The information processing system 1200 is based upon a suitably configured processing system adapted to implement the exemplary embodiment of the present invention. Similarly, any suitably configured processing system can be used as the information processing system 1200 by embodiments of the present invention.

The information processing system 1200 includes a computer 1202. The computer 1202 has a processor(s) 1204 that is connected to a main memory 1206, mass storage interface 1208, and network adapter hardware 1210. A system bus 1214 interconnects these system components. The main memory 1206, in one embodiment, comprises the IHCS 104 and the image database 110. The mass storage interface 1208 is used to connect mass storage devices, such as data storage device 1212, to the information processing system 1200. One specific type of data storage device is an optical drive such as a CD/DVD drive, which may be used to store data to and read data from a computer readable medium or storage product such as (but not limited to) a CD/DVD 1216. Another type of data storage device is a data storage device configured to support, for example, NTFS type file system operations.

In one embodiment, the information processing system 1200 utilizes conventional virtual addressing mechanisms to allow programs to behave as if they have access to a large, single storage entity, referred to herein as a computer system memory, instead of access to multiple, smaller storage entities such as the main memory 1206 and mass storage device 1212. Note that the term "computer system memory" is used herein to generically refer to the entire virtual memory of the information processing system 1200.

Although only one CPU 1204 is illustrated for computer 1202, computer systems with multiple CPUs can be used equally effectively. Embodiments of the present invention further incorporate interfaces that each includes separate, fully programmed microprocessors that are used to off-load processing from the CPU 1204. An operating system (not shown) included in the main memory is a suitable multitasking operating system such as the Linux, UNIX, Windows XP, and Windows Server operating system. Embodiments of the present invention are able to use any other suitable operating system. Some embodiments of the present invention utilize architectures, such as an object oriented framework mechanism, that allows instructions of the components of operating system (not shown) to be executed on any processor located within the information processing system 1200. The network adapter hardware 1210 is used to provide an interface to a network 1218. Embodiments of the present invention are able to be adapted to work with any data communications connections including present day analog and/or digital techniques or via a future networking mechanism.

Although the exemplary embodiments of the present invention are described in the context of a fully functional computer system, those of ordinary skill in the art will appreciate that various embodiments are capable of being distributed as a program product via CD or DVD, e.g. CD 1216, CD ROM, or other form of recordable media, or via any type of electronic transmission mechanism.

Non-Limiting Examples

Although specific embodiments of the invention have been disclosed, those having ordinary skill in the art will understand that changes can be made to the specific embodiments without departing from the spirit and scope of the invention.

The scope of the invention is not to be restricted, therefore, to the specific embodiments, and it is intended that the appended claims cover any and all such applications, modifications, and embodiments within the scope of the present invention.

What is claimed is:

1. An automated visual processing system comprising:
   a memory;
   an information processor and controller, communicatively coupled with the memory;
   a video imaging system, communicatively coupled with the information processor and controller and the memory, for receiving a plurality of images representing frames of a video sequence of an external environment of a vehicle;
   a blob detector, communicatively coupled with the video imaging system, the information processor and controller, and the memory, for identifying a blob within each frame of the plurality of images;
   a blob feature extractor, communicatively coupled with the blob detector, for extracting a plurality of features from a blob found by the blob detector;
   a blob classifier, communicatively coupled with the blob feature extractor and the blob detector, for recognition of a type of a blob, selected from a plurality of types of blobs, that is found by the blob detector, wherein the blob classifier is a machine learning classifier that utilizes a support vector machine model to recognize the plurality of types of blobs, wherein the support vector machine model has been trained with respect to the plurality of types of blobs; and
   an event controller, communicatively coupled with the blob classifier and the blob detector, for determining a binary decision based at least on the recognized type of blob that is found by the blob classifier and a set of rules comprising at least one rule for detecting a given environment type based on calculated ambient brightness and average edge energy of frames of the plurality of images, and performing an action based on such decision.

2. The intelligent headlight control system of claim 1, wherein the binary decision is a decision to one of turn on a high headlight beam and a low headlight beam.

3. The intelligent headlight control system of claim 1, wherein the plurality of features extracted from a blob identified by the blob detector comprises at least one of the following types of features: blob position, blob brightness, blob shape, blob spatial relation, blob color, and blob motion.

4. The intelligent headlight control system of claim 1, wherein the plurality of types of blobs recognized by the blob classifier comprises at least one of the following types of blobs:
   headlight, taillight, streetlight, and other.

5. The intelligent headlight control system of claim 1, wherein the light beam controller changes a current state of a light beam of the vehicle based on the blob types recognized by the blob detector, and a given set of rules for changing the current state of the light beam when the environment type is one of a curved road and an urban area.

6. The intelligent headlight control system of claim 1, further comprising a video camera mounted around a windshield region of a vehicle and aimed toward the external environment of the vehicle, the video camera being communicatively coupled with the video imaging system for capturing the plurality of images representing frames of the video sequence of the external environment of the vehicle.

7. The intelligent headlight control system of claim 1, wherein the environment type is detected as an urban scene based on a detected number of blobs within each frame, the ambient brightness and the average edge energy of the frame.

8. The intelligent headlight control system of claim 1, wherein the set of rules comprise rules associated with an outcome of tracking light objects of specific light types being detected in the previous frame, and a decision based on a voting strategy applied to a given timing window, where different voting strategies are applied to turning on a high headlight beam and turning on a low headlight beam, respectively.

9. A method, with an information processing system, for an intelligent headlight control system, the method comprising:
   receiving a plurality of images representing frames of a video sequence of an external environment of a vehicle;
   identifying at least one blob that stands out from a dark background of the external environment within each frame of the plurality of images;
   extracting a plurality of features from a found blob;
   recognizing a type of a found blob, selected from a plurality of types of blobs;
   determining whether to turn on a high beam light or a low beam light based at least on the recognized type of the found blob using a machine learning classifier and a set of rules comprising at least one rule for detecting a given environment type based on calculated ambient brightness and average edge energy of frames of the plurality of images, wherein the machine learning classifier utilizes a support vector machine model to recognize the plurality of types of blobs, and wherein the support vector machine model has been trained with respect to the plurality of types of blobs; and
   performing an action based on such decision.

10. The method of claim 9, wherein the plurality of features extracted from a found blob comprises at least one of the following types of features:
    blob position, blob brightness, blob shape, blob spatial relation, blob color, and blob motion.

11. The method of claim 9, wherein the plurality of types of blobs comprises at least one of the following types of blobs:
    headlight, taillight, streetlight and other.

12. The method of claim 9, further comprising:
    generating a beam history log;
    storing a historical information of state of high beam light on or low beam light on for one or more frames of the plurality of images; and
    tracking the historical information.

13. The method of claim 9, further comprising:
    detecting the environment type as an urban scene based on a detected number of blobs within each frame; and
    an ambient brightness and an average edge energy of each frame.

14. The method of claim 9, further comprising:
    deriving a set of rules associated with an outcome of tracking light objects of specific light types being detected in the previous frame, and a decision based on a voting strategy applied to a certain timing window, where different voting strategies are applied to turning on a high headlight beam and turning on a low headlight beam, respectively.

15. A non-transitory computer program product tangibly embodying computer readable instructions which, when implemented cause a computer to carry out the steps of a method for intelligently controlling a headlight system, the method for:
    receiving a plurality of images representing frames of a video sequence of an external environment of a vehicle;

identifying at least one blob that stands out from a dark background of the external environment within each frame of the plurality of images;

extracting a plurality of features from a found blob;

recognizing a type of a found blob, selected from a plurality of types of blobs;

determining whether to turn on a high beam light or a low beam light based at least on the recognized type of the found blob using a machine learning classifier and a set of rules comprising at least one rule for detecting a given environment type based on calculated ambient brightness and average edge energy of frames of the plurality of images, wherein the machine learning classifier utilizes a support vector machine model to recognize the plurality of types of blobs, and wherein the support vector machine model has been trained with respect to the plurality of types of blobs; and performing an action based on such decision.

16. The non-transitory computer program product of claim 15, wherein the plurality of features extracted from a found blob comprises at least one of the following types of features: blob position, blob brightness, blob shape, blob spatial relation, blob color, and blob motion.

17. The non-transitory computer program product of claim 15, wherein the plurality of types of blobs comprises at least one of the following types of blobs: headlight, taillight, streetlight and other.

18. The non-transitory computer program product of claim 15, further comprising instructions for: generating a beam history log;

storing a historical information of state of high beam light on or low beam light on for one or more frames of the plurality of images; and tracking the historical information.

19. The computer program product of claim 15, further comprising instructions for:

detecting the environment type as an urban scene based on a detected number of blobs within each frame; and an ambient brightness and an average edge energy of each frame.

20. The computer program product of claim 15, wherein the method is further for:

deriving a set of rules associated with an outcome of tracking light objects of specific light types being detected in the previous frame, and a decision based on a voting strategy applied to a certain timing window, where different voting strategies are applied to turning on a high headlight beam and turning on a low headlight beam, respectively.

* * * * *